United States Patent
MacLean et al.

(10) Patent No.: US 11,012,967 B1
(45) Date of Patent: May 18, 2021

(54) SYSTEM FOR DETERMINING PRECISE LOCATION OF A SOUGHT DEVICE BY SOLVING THE LAST MILE PROBLEM

(71) Applicant: Disney Enterprises, Inc., Burbank, CA (US)

(72) Inventors: Dave MacLean, Orlando, FL (US); John R. Parron, Winter Garden, FL (US); James Lee Egger, Valrico, FL (US); Mangesh Patil, Winter Garden, FL (US); Megha Vyas, Troy, MI (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 16/778,784

(22) Filed: Jan. 31, 2020

(51) Int. Cl.
| | |
|---|---|
| *H04W 24/00* | (2009.01) |
| *H04W 64/00* | (2009.01) |
| *H04W 4/80* | (2018.01) |
| *H04W 4/029* | (2018.01) |
| *H04B 17/318* | (2015.01) |

(52) U.S. Cl.
CPC ........ *H04W 64/003* (2013.01); *H04B 17/318* (2015.01); *H04W 4/029* (2018.02); *H04W 4/80* (2018.02)

(58) Field of Classification Search
CPC ..... H04W 64/003; H04W 4/80; H04W 4/029; H04B 17/318
USPC ...................................................... 455/456.1
See application file for complete search history.

(56) References Cited

U.S. PATENT DOCUMENTS

| | | | | |
|---|---|---|---|---|
| 9,591,453 | B1* | 3/2017 | Hyde | G01S 5/0231 |
| 9,823,333 | B2* | 11/2017 | Cox | H04W 8/005 |
| 9,900,733 | B2* | 2/2018 | Beattie, Jr. | H04W 4/02 |
| 10,068,456 | B2* | 9/2018 | Cox | G08B 13/1427 |
| 10,506,517 | B2* | 12/2019 | Dai Javad | H04W 4/023 |
| 2013/0002402 | A1* | 1/2013 | Guttman | G01S 13/82 340/8.1 |
| 2014/0022123 | A1* | 1/2014 | Bruder | H01Q 1/125 342/359 |
| 2020/0260514 | A1* | 8/2020 | Foster | G06F 1/1626 |
| 2020/0375149 | A1* | 12/2020 | Anderton | H04W 4/80 |

* cited by examiner

*Primary Examiner* — Amancio Gonzalez
(74) *Attorney, Agent, or Firm* — Snell & Wilmer L.L.P.; Kent A. Lembke

(57) ABSTRACT

A system for use in locating a sought device such as a smartphone or smart communication device. The system includes a sought device communicatively linked to a communications network. The sought device uses locating technologies to determine an approximate location of the sought device and operates to trigger a locating session and to transmit a message over the communications network including the approximate location. The system includes a seeker device communicatively linked to the communications network operable to receive a message over the communications network including the approximate location of the sought device. The sought device scans for broadcasts from the seeker device, and the seeker device broadcasts a wireless message. The sought device receives the wireless message, determines a signal strength, and transmits the signal strength to the seeker device. The seeker device processes the signal strength to generate an indicator of a location of the sought device.

18 Claims, 9 Drawing Sheets

SYSTEM FOR DETERMINING PRECISE LOCATION OF A SOUGHT DEVICE BY SOLVING THE LAST MILE PROBLEM

BACKGROUND

1. Field of the Description

The present description relates, in general, to locating technologies in seeker-sought scenarios and to methods and systems for accurately determining a position of a sought device in challenging environments such as an indoors setting. More particularly, the present description relates to a method and system for solving the last mile problem to determine an accurate position or location of a sought device (also called a triggering device herein) even when the sought device is located indoors or in another space limiting accuracy of conventional locating technologies or when the sought device is located in any area lacking infrastructure needed to support accurate positioning by conventional locating technologies.

2. Relevant Background

There are many situations in which it is desirable to provide an accurate position of a person in a physical environment or space. This person or "the sought" may be carrying or wearing an electronic device such as a cellular telephone (or cellphone) or a smartphone or other smart device configured with or to support locating technologies, but it may still be difficult in many settings to determine an accurate position for this person. As a specific example, it is desirable for a person in need of assistance, such as a housekeeper in a large facility, to be able to signal for help whether they are indoors or outdoors and for responders (or "the seekers") to locate this person seeking help with precision. Often, it is desirable that the person seeking help can be tracked if they are moving after signaling for help and without the need for any continuing action by this person (e.g., without the need for the person to continue to communicate directly or through their smart device (or other communication device) with the seeker(s)).

More generally, there are needs in safety, social, and commerce contexts for accurate location capabilities. Current solutions using locating technologies can get a responder or seeker within a general vicinity of someone calling for help or attention, but the current solutions then rely on visual or audible contact with the person being sought to help the seeker reach them over the last several meters or to address "the last mile" problem. This technique, though, often will not produce desirable results. Where visual or audible contact does not work, the finding of the person seeking attention may be delayed by critical seconds (in a health or safety situation) or may be wholly ineffective with the person not being found. For example, present locating technologies may be able to locate a building in which a device of a sought person is positioned but not be able to identify the correct room or floor as the position may be inaccurate by several meters.

Existing positioning solutions rely on locating technologies such as Global Positioning System (GPS) techniques, cellphone tower triangulation, and Wi-Fi-based positioning (WPS). Each of these uses signal strength or time of flight triangulation techniques to locate a person or, more accurately, their beaconing device as precisely as possible. With proper infrastructure, these solutions can provide a very precise location for the beaconing device. However, the infrastructure, such as high-density beacons, is both expensive and invasive. Signal processing techniques can also be confounded and made less accurate by multipath, signal blockage, and other errors introduced by physical features of an environment in which the person with the sought device is presently located. Moreover, prior positioning techniques only work as designed where the infrastructure is already installed. As a result, if a person calling for help or attention has the misfortune of being in a space that is not covered with high granularity or where they are not visible, existing positioning and/or response systems may get responders or seekers close but not all the way to the person needing help or attention (i.e., not get the seeker "the last mile" to finding the sought device and associated person).

Hence, there remains a need for a new method and system for solving the last mile problem to allow a seeker (or their seeker device) to determine a precise location of a sought person (or "the sought" or their sought device). Preferably, the new method and system would be adapted to not require the sought to take any actions during the process to solve the last mile problem as is the case with many solutions relying on current locating technologies.

SUMMARY

To address the above and other issues, the inventors designed a system (and associated method(s)) for more precisely locates a sought device with a seeker device than is possible with conventional locating technologies. The sought and seeker devices may be smartphones or other devices adapted for communicating over a communications network and also in a device-to-device or wireless manner. The new system flips the roles of the sought and seeker device as the sought device does not have to be operated in an active manner by its operator. Instead, the sought device is configured to trigger a "find me" or locating session and communicate over the communication network its location approximated by conventional locating technologies (e.g., GPS, Wi-Fi, or other techniques). The seeker device broadcasts a beacon using the wireless device-to-device communications techniques, and the sought device scans in its background operations for this beacon. In response to receipt, the sought device determines the signal strength of the beacon and communicates this information to the seeker device. In response, the seeker device determines a relative distance between the two devices, and this data is presented to its operator to assist in moving in directions to reduce this distance until the two devices are collocated (or within about 1 meter).

More particularly, a system is provided for use in locating a sought device. The system includes a sought device communicatively linked to a communications network. The sought device uses locating technologies to determine an approximate location of the sought device, and the sought device operates to trigger a locating session and to transmit a message over the communications network including the approximate location. The system also includes a seeker device communicatively linked to the communications network operable to join the locating session and to receive a message over the communications network including the approximate location of the sought device. During system operations, the sought device scans for broadcasts from the seeker device, and the seeker device broadcasts a wireless message. Further, during system operations, the sought device receives the wireless message from the seeker device, determines a signal strength associated with the wireless message, and transmits the signal strength to the seeker device. Still further, the seeker device processes the signal strength to generate an indicator of a location of the sought device relative to a present location of the seeker device.

In some embodiments, the indicator includes a distance (or representation of distance) between the seeker and sought devices. In such cases, the distance is computed based on the signal strength and power level used to broadcast the wireless message. In the same or other cases, the system may also include a server connected to the communications network, and the seeker device communicates the distance between the seeker and sought devices and the present location of the seeker device determined by its locating technologies to the server. Then, the server receives from two or more other seeker devices distances to the sought device and present locations and, in response, computes a likely location of the sought device and communicates the likely location to each of the seeker devices.

Every physical movement of the seeker that results in shortening of the calculated distance between the seeker and the sought positively reinforces the direction of the movement using a feedback loop, thereby establishing a gradient of the desired movement. The error due to the noise in the signal is averaged out over successive pings.

It may be useful in some implementations for the wireless message to include a payload providing an identifier for the seeker device, and the signal strength can then be communicated via a message over the communications network that includes the signal strength and an update of the approximate location, whereby the sought device may be moving during the locating session. In some cases, the indicator is a directional indicator relative to the present location of the seeker device.

In some embodiments, the wireless message is broadcast from the seeker device with an operator of the seeker device holding the seeker device and rotating about vertical to two or more angular positions. Then, an indicator of the signal strength is output via operation of the seeker device to the operator for each of the angular positions. In some planned implementations, the wireless message is broadcast from the seeker device using Bluetooth Low Energy (BLE).

DETAILED DESCRIPTION

Figure 1:
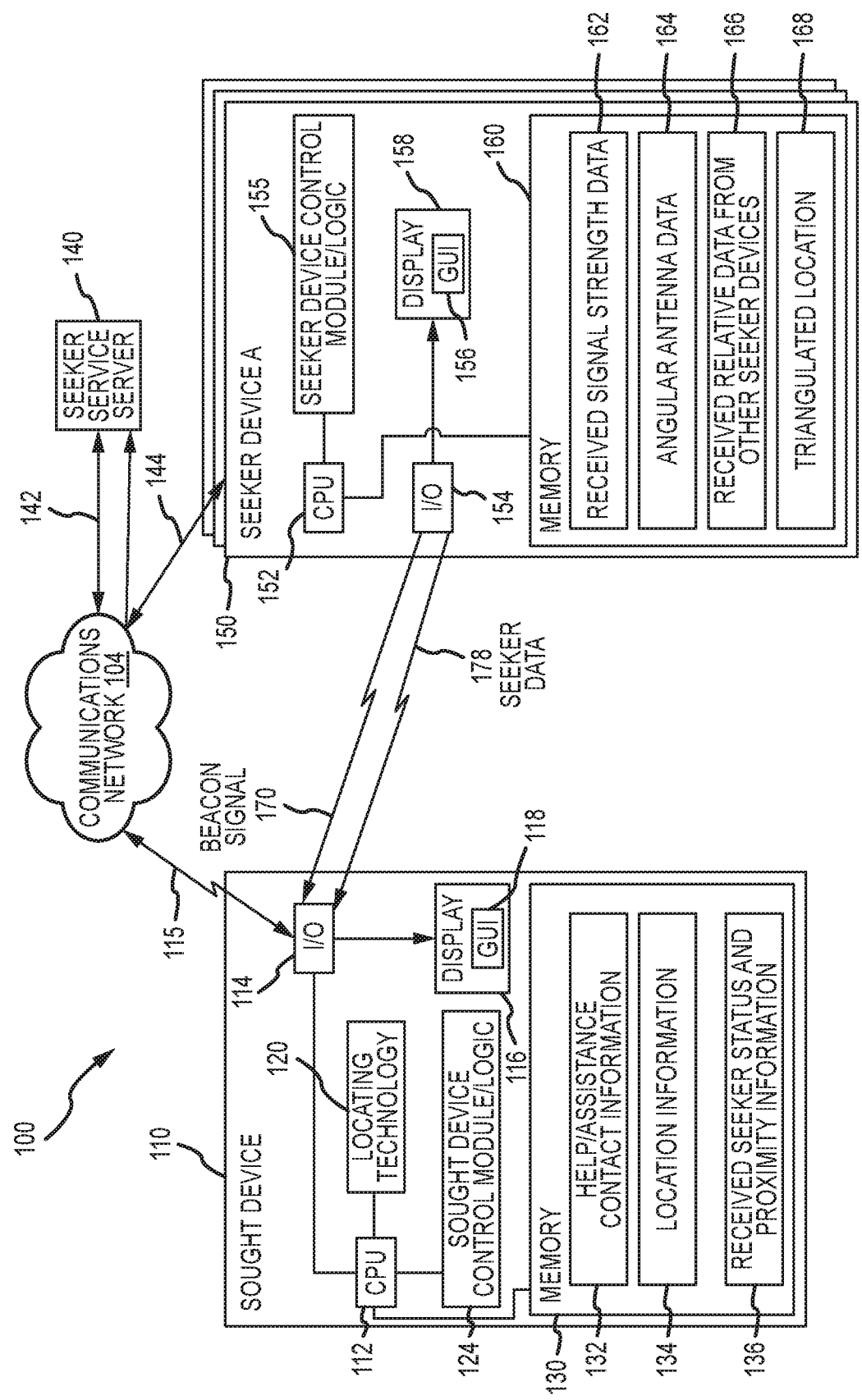
FIG. 1 is a functional block drawing of a response or locating system adapted to perform a two-stage locating process of the present description to better solve the last mile in positioning problem.

In brief, the inventors recognized that to determine a precise location of a sought device (or simply "the sought" in some cases herein) it would be very useful to solve the last mile problem in a manner that does not require visual or audio contact with the person operating or otherwise associated with the sought device. In this regard, a locating or response system (and associated method(s)) is described that implements a two-stage response location process to solve the last mile problem.

The first stage or step allows a person in need of help or assistance to trigger a call for help or assistance using a handheld or worn device (i.e., the sought or the sought device). Hence, the two-stage response system may be considered to include the sought device adapted to send the trigger signal or communication. The two-stage response system may use conventional locating techniques (such as GPS techniques, cellphone triangulation, and/or Wi-Fi-based positioning (WPS)) and infrastructure (in many cases) to determine a first or gross location for the sought device and to lead the seeker or responder with their seeker device to a general vicinity of the sought device and person requesting help or attention.

Based on the logic or code running in the locating or response system, when the call or signal for help or assistance is triggered (by operations of the sought device), the second stage or step of the locating process is also launched or initiated. The second stage involves the sought device (e.g., cellphone, smart device, or the like of the person seeking help or assistance) being activated to begin to actively listen for location beacons (e.g., signals or beacons from a BLE (e.g., a Bluetooth low energy beacon) or other transmitter) transmitted by one or more seeker devices held or worn and operated by personnel that have used the output location from the first stage to position themselves and their smart devices (seeker devices) in the general vicinity of the sought device (and associated person). The sought device processes the received seeker beacon, determines a signal strength, and communicates this signal strength back to the seeker device (or source of the received beacon).

The received signal strength is a sensitive function of relative distance between the beacon emitted by the responder's device or seeker device and the sought device possessed by the person requesting help or attention/service. The seeker device includes logic or code to process the received signal strength and to determine a direction from their current location to the sought device. The seeker device does not need to triangulate or undertake complex signal analysis to determine the proper direction. Instead, stronger signal strength or signals will lead towards the sought device operated by a person to initiate the trigger, and weaker signal strength or signals will quickly provide an accurate indication to the seeker via their seeker device (e.g., via a graphical user interface (GUI) displayed on a display element) they are moving in the wrong direction.

The new locating or response system is, hence, configured to ensure that the person who triggered the help or assistance call does not need to take any further action to be located using a seeker device. Even if they move (and move the sought device with them), they do not need to call the responder or seeker or check in to tell the seeker they are on the move. In some cases, though, the location (and/or proximity) and/or status of the seeker (or their device) can be communicated to the sought device for display (on a local GUI) to the sought person (e.g., in an e-commerce or any non-safety or threat use cases).

Additional logic and/or processes may be utilized in the new locating or response system to enhance the speed and/or accuracy of the obtained solution. First, an additional processing step may be added to allow a single responder or seeker to more easily locate a person who has activated or initiated the trigger signal or communication on their sought device. The seeker or responder, after they are in the general vicinity provided by performing the first stage of the locating method, may be prompted (such as via a GUI on their seeker device) to rotate their body (e.g., a full 360-degree rotation) about vertical while continuing to hold the seeker device. Logic or code running on the seeker device is adapted to plot the signal strength relative to direction (north, south, east, and west) using signal strength data received from the sought device during this rotation. The seeker can choose which direction to walk in next based on a display of this plot (or the GUI may provide a visual or audio cue to the seeker to encourage the seeker). This technique uses the seeker's body as a radio frequency blocker so that the seeker device behaves more like a 180-degree antenna, which allows direction of a beaconing source to be determined.

Second, additional processing can be provided on each seeker device to allow seeker or responder groups to share their relative data (e.g., signal strength, rotational angle, and the like) with other seeker devices in the group trying to locate a particular sought device. Each seeker device would include logic or executing code adapted to process the relative data they produce with that received from other seeker devices to perform localized, real-time triangulation for the sought device, thereby speeding up the response time.

FIG. 1 illustrates a functional block diagram of a locating or response system 100 of the present description. The system 100 includes a sought device 110 and one-to-many seeker devices with device 150 being representative of such devices. The sought device 110 may take the form of nearly any electronic device configured for wireless communications over a communications network 104 such as a cellphone, a smartphone, a tablet or computing device configured for wireless communications, and the like. The sought device 110 typically would be a device carried or worn by a person who may at some point require help, service, or other "attention," and, hence, the sought device 110 is configured for initiating or triggering a response or locating session (e.g., the locating method(s) taught herein) in system 100.

The sought device 110 includes a processor 112 managing operations of the device 110 including executing logic or executable instructions/code to provide the functions of a sought device control module 124. Further, the processor 112 manages operations of input/output (I/O) devices 114, which are shown to include a display 116 upon which a GUI 118 may be generated and displayed to the operator or person seeking attention (not shown). The I/O devices 114 may include transmitters and receivers useful for communicating in a wireless manner with other devices including the seeker device 150 over the communications network 104 (e.g., a cellular network) as shown with messages or signals 115 or directly (e.g., using Bluetooth or other technologies) as shown with signals or communication messages 170 and 178. The processor 112 also manages operations of onboard location technology 120 that is operable to determine location information 134 for the sought device 110, and it may take the form of any existing or yet to be developed locating technology useful for obtaining a relatively precise location of the device 110 (but missing the last mile or improved precision as provided herein). The technology 120 may use GPS, Wi-Fi, or other techniques to obtain a location 134 within a few meters of the correct location as is well-known in the arts.

The sought device 110 also includes memory or data storage 130 and access to and from the memory 130 is managed by the processor 112. The memory 130 is used to store the location information 134 generated by the locating technology 120. Further, the memory 130 is used to store help or assistance/attention contact information 132 that is useful for allowing the sought device 110 to be operated to trigger or initiate a locating or response session (e.g., to request to be found by an operator of a seeker device 150). Additionally, the memory 130 is used to store received seeker status and proximity information 136 (from the seeker device 150 as shown at 178 and/or from the seeker service server 140 as shown via communications 115 and 142 through network 104).

The seeker device 150 may also take a wide variety of forms to implement the system 100 and may, as with the device 110, be nearly any smart wireless communication device such as a portable computer, a cellphone, a smartphone, or the like. The seeker device 150 includes a processor 152 managing operations of I/O devices 154 that include transmitters, receivers, and/or transceivers useful for communicating with other seeker devices and the sought device 110 via the network 104 or directly as shown with arrows 115, 142, 144 and 170, 178, respectively. The I/O devices 154 may include a display 156 for displaying a generated GUI 158 to display information to an operator of the seeker device 150 (not shown).

The processor 152 executes code/instructions to provide the device 150 with the functions of a seeker device control module/logic 155 as described herein. Further, the seeker device 150 includes memory or data storage 160 for storing received signal strength data 162 from the sought device 110, for storing angular antenna data 164 generated by the control module/logic 155, for storing relative data 166 received from other seeker devices, and for storing a triangulated location 168 for the sought device 110 calculated by the control module/logic 155 from the relative data 166. Alternatively, the location 168 could have been calculated by the seeker service server 140 and sent to each seeker device.

During operations of the system 100, an operator of the sought device 110 triggers the start of a locating or response session such as by pressing a panic or help button on the touchscreen display 116 in a GUI 118, which may result in a direct message to a seeker device 150 or a message 115 being sent via communications network 104 to a seeker service server 140 as shown via messages 142 (e.g., using contact information 132) who then transmits a message 144 via network 104 to a seeker device(s) 150 to respond to the call (and seek the device 110). The triggering action may be a request for a service such as for a delivery of food or merchandise with a message 115 to a server 140 so as to get the locating or response session started and causing the sought device control logic 124 to begin running in the background on the device 110 (e.g., without requiring further actions by the operator of the device 110). In other cases, the control module 124 may determine when the triggering event or action has occurred and transmit a message 115 for attention to the server 140. For example, the control module 124 may detect a sudden deceleration that may be associated with a person holding or wearing the device 110 falling to the ground and requiring help.

The communication 115 from the sought device 110 also will include location information 134 obtained for the sought device 110 by its locating technology 120. For example, GPS devices and techniques may be used to obtain a gross location with precision within 20 or fewer meters (depending upon parameters such as whether the device 110 is indoors or whether proper supporting infrastructure exists at present location of device 110). This first or gross location is provided in message 144 from the seeker service server 140 at the start of a locating or response session. The operator of the seeker device 150 responds by moving into a space that matches or is proximate (e.g., within several meters or the like) of the first or gross location. Concurrently or before this time, the control module/logic 124 on the sought device 110 begins to monitor input to the receiver(s) of the I/O devices 114 to monitor for beacon signals 170 from one or more seeker devices 150.

In a next or second stage of the locating or response session, the seeker device 150 has its control module 155 operate the I/O devices 154 to generate beacons or beacon signals 170 (such as via Bluetooth or other communication protocols and devices). The sought device 110 uses its receivers in the I/O devices 114 to receive the beacon signal 170, and the control module/logic 124 processes this to determine the strength of this signal. The relative strength data is communicated by the control module 124 via I/O devices 114 as shown with communication 115, 142, 144 to seeker service server 140 and the seeker device 150. This data is stored as shown at 162 in memory 160, and the module/logic 155 processes this data to determine a direction the operator of the seeker device 150 should now travel to move toward the present location of the sought device 110. In some cases, the relative data is plotted and presented to the operator in a GUI 158 on device 150 or another relative direction prompt may be provided visually or audibly to the seeker or operator of device 150. This process is repeated until the sought device 110 (and its operator) is found by the seeker device 150 (e.g., the locations of the two devices 110, 150 match (collocated) or are nearly matching (e.g., within 1 meter or the like)).

In some embodiments, the seeker device 150 will also be operated by the control module 155 to communicate seeker data (as shown with signal/message 178) to the sought device 110. This data may include the present status and proximity of the seeker device 150 to the sought device 110, and this information may be displayed on a GUI 118 or otherwise (e.g., audibly over speakers of I/O devices 114) to the operator of device 110. As explained in more detail below, the locating session may also involve the operator of the device 150 being prompted to hold their device 150 and rotate physically to allow the control module 155 to obtain a plurality of signal strength data 162. This data can be correlated to the differing angles relative to vertical to obtain angular antenna data 164 so as to better define the direction from the present starting point in which the seeker device 150 should be moved to walk in a direction corresponding with higher signal strengths (being detected at the sought device 110 via receipt of beacon signals 170). Such data 164 may be presented to the operator of the device 150 in graph or plot form in the GUI 158 on display 156.

In the same or other implementations, the control module 155 may also be configured to cause the I/O 154 to be used to transmit and receive relative data from other seeker devices 166 concurrently searching for the sought device 110. This relative data (e.g., the signal strengths the other devices 150 are receiving from the sought device 110 and determined highest strength direction) 166 can be processed by the control module/logic 155 to generate or calculate a triangulated location 168 (e.g., when there are three or more seeker devices 150). Note that the seeker service may also be where the computations are done using the sought data and the seeker data, with the resulting sought position being communicated to each seeker device. The location 168 may be presented to the operator of the device 150 in GUI 158 on display 156 for their use in more quickly and efficiently locating the sought device 110 and its operator.

Figure 2:
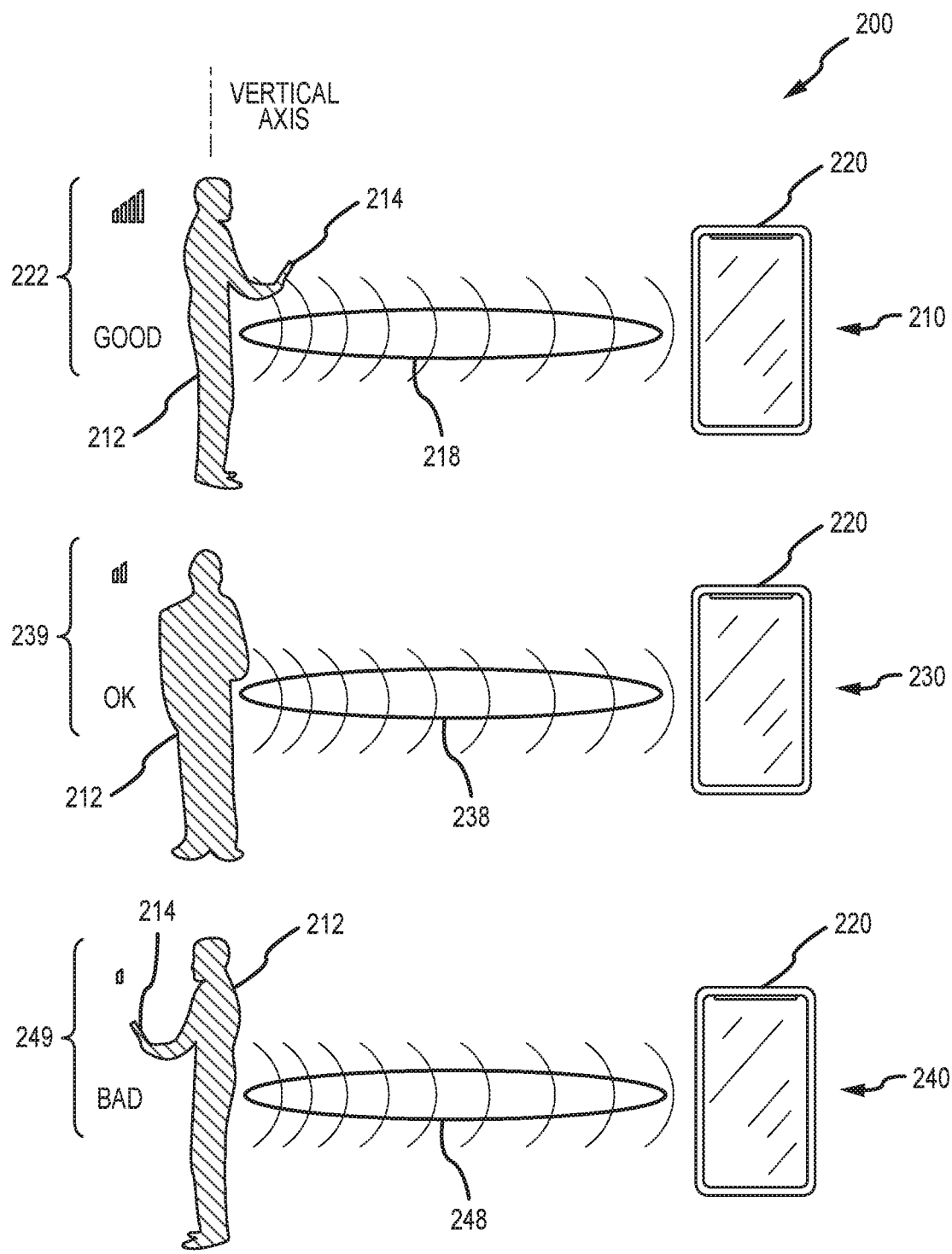
FIG. 2 illustrates schematically the use of a response or locating system, such as that shown in FIG. 1, during a process for obtaining angular antenna data for refining location data for a sought device.

FIG. 2 illustrates schematically the use of a response or locating system, such as that shown in FIG. 1, during a process 200 for obtaining angular antenna data for refining location data for a sought device 220. In a first stage or step 210, a seeker 212 is facing a first direction relative to vertical with a seeker device 214 held in front of them. The seeker device 214 transmits beacons and receives back from the sought device 220 data on signal strength, with these communications shown with waves 218. The signal strength data is processed to determine relative signal strength which may be displayed or reported to the operator 212 as shown graphically and textually at 222 (such as in a GUI on device 214). In some preferred implementations, while the seeker device transmits wireless signals (e.g., BLE beacon signals) to the sought device, the signal strength is communicated back to the seeker device using the communication network (e.g., signals 115/144 in FIG. 1).

In a second stage or step 230, the operator has rotated about vertical approximately 90 degrees, and communications 238 between the seeker and sought devices 214 and 220 provides signal strength data. This is processed by the seeker device 214 to provide strength data information 239 to the operator of the seeker device 214, which shows that moving further in this direction is less desirable than in the direction of step 210 as the relative signal strength is less than obtained in that step (as shown by comparing 222 with 239). In a third stage or step 240, the operator has rotated about vertical another 90 degrees, and communications 248 between the two devices 214 and 220 provides signal strength data. The device 214 processes this data to provide relative strength data 249, which indicates that the operator 212 should not move further in the direction they are facing as the signal strength is weakest of the three directions. The seeker is the transmitter such as with an antenna to broadcast its signal. The signal goes in all directions and is attenuated by the body of the seeker/user 212 if the device 214 is on the opposite side of the seeker body 212 from the sought device 220. The seeker body 212 acts as an RF shield.

Figure 3:
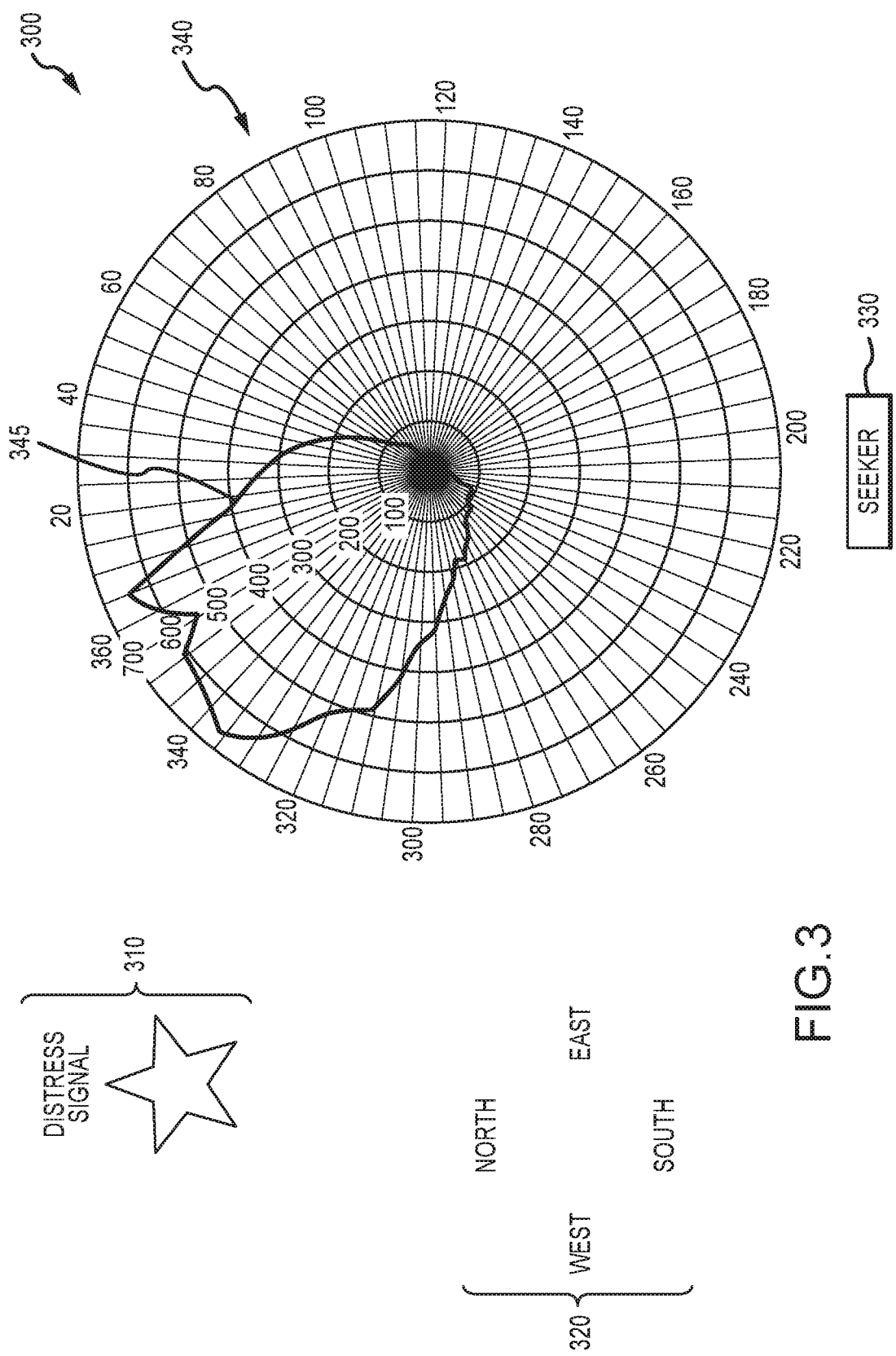
FIG. 3 illustrates schematically or functionally a locating process as may be carried out by a locating or response system of the present description such as the one in FIG. 1 including showing a portion of a GUI that may be provided to an operator of a seeker device.

FIG. 3 illustrates schematically or functionally a locating process 300 as may be carried out by a locating or response system of the present description, such as system 100 of FIG. 1. As shown, a sought device 310 at a particular physical location generates a distress or other triggering signal that initiates or triggers the beginning of a locating session including causing its onboard components to provide location data from its locating technology components and to monitor for beacons from seeker devices in the vicinity. A seeker or responder device 330 is operated to move to a location near the sought device 310 based on the provided gross or initial location data from sought device 310, and its display or GUI may be used to provide feedback to the operator of the seeker device 330 including direction data 320. The control module or logic on the seeker device 330 processes signal strength data from the sought device 310 based on its processing of beacons from the seeker device 330 to determine a direction from the seeker device 330 (its current location) to the sought device 310 (and its current location, which may change over time if the device 310 is nonstationary). The relative strength data may be processed to generate a polar plot 340 with a graph/data line 345 indicating the results of the signal strength processing, which is useful for showing an operator visually which direction they should proceed in relative to the directional information 320 or on its own to move toward the location of the sought device 310 and its operator (the sought).

Figure 4:
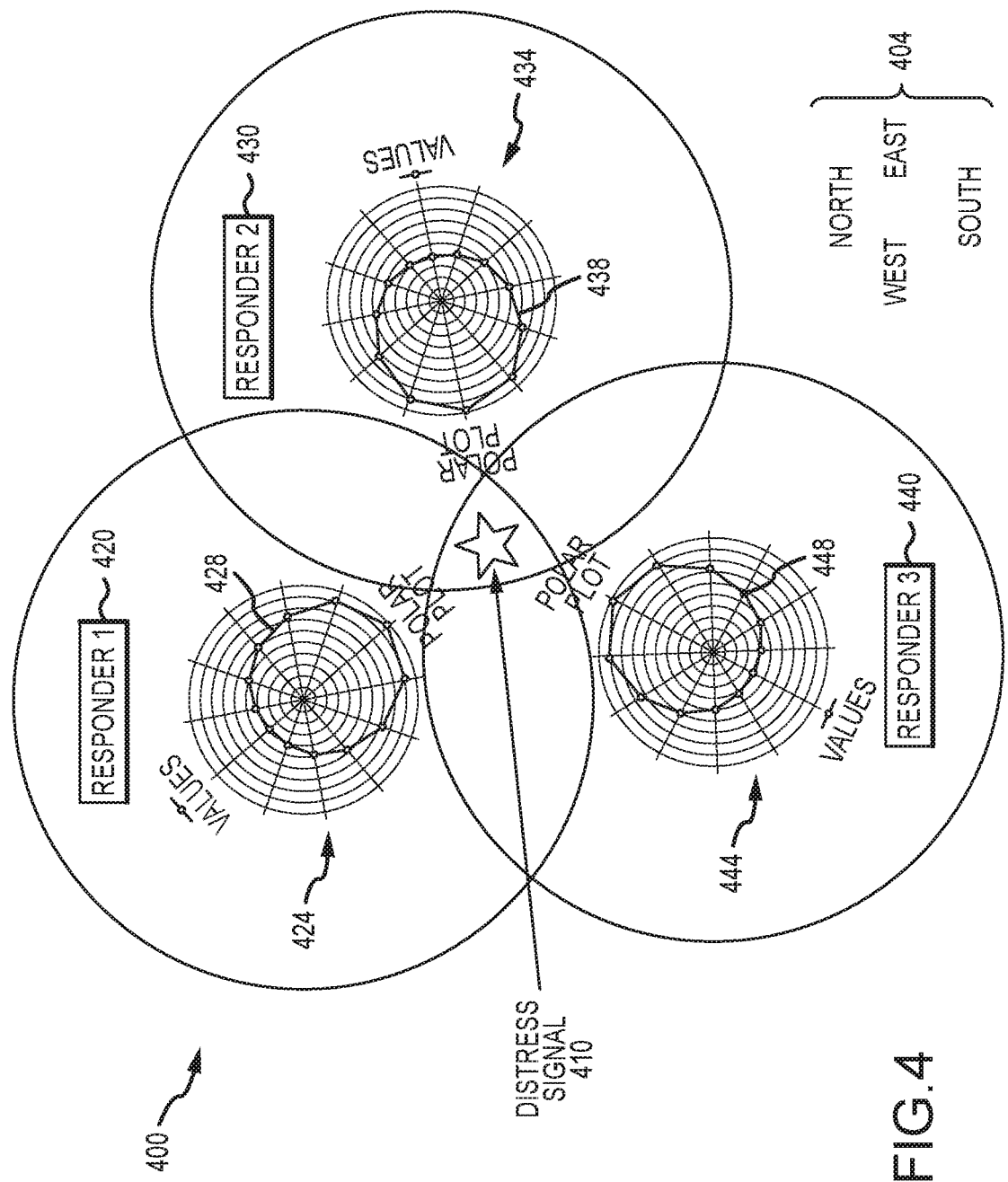
FIG. 4 illustrates graphically the processing of relative signal strength data from multiple seeker devices to use triangulation techniques to obtain a location of a sought device as may be carried out during operation of the system of FIG. 1.

FIG. 4 illustrates graphically a processing method or process 400 for using and/or processing relative signal strength data from multiple seeker devices 420, 430, 440. Each seeker device 420, 430, and 440 operates independently to communicate beacons to a sought device 410 operating at a particular location after it transmits a distress/attention signal, and the sought device 410 operates to provide each seeker device 420, 430, 440 signal strength data in response to their beacons. As shown, the seeker devices 420, 430, and 440 process the signal strength data to determine which direction they should be moved to place them closer to the sought device 410 (with directional information shown at 404 as may or may not be provided to operators of devices 420, 430, and 440 via local displays), and this information may be presented to an operator in the form of a graph 424, 434, and 444 with a signal strength plot 428, 438, and 448. These three sets of data and/or their directional outputs/results may then be shared with each of the devices 420, 430, 440 for processing (e.g., by each of the control modules/logic on a seeker device or by a seeker service server that then sends results to all seekers) to obtain a triangulation-type location (point or area of crossover of the three (or more) directional outputs from plots 428, 438, and 448) as shown graphically with the overlapping area of the three circles drawn about the seeker devices 420, 430, and 440.

Figure 5:
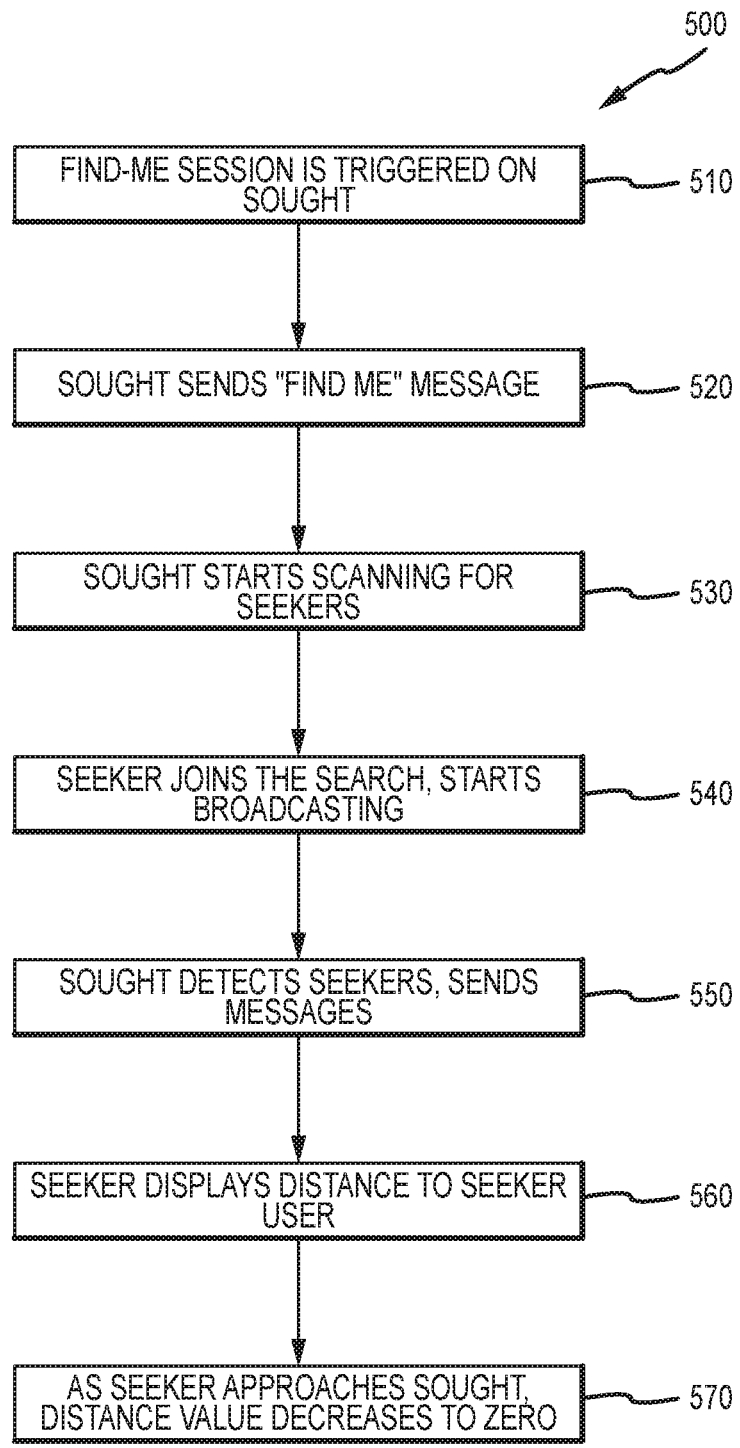
FIG. 5 is a flow diagram of a locating method as may be carried out by operation of a response or locating system (such as that of FIG. 1) of the present description when there is a signal seeker.

FIG. 5 is a flow diagram of a locating method 500 as may be carried out by operation of a response or locating system (such as that of FIG. 1) of the present description when there is a signal seeker searching for a sought device. In the description that follows, the term "seeker" or "seeker device" is used to mean a device operated by a seeking person and the term "sought" or "sought device" is used to mean a device operated by a person requesting assistance. Note, both the seeker device and the sought device typically have to have network connectivity for sending messages for the method 500 to be successful. Also, each device should be equipped with some sort of wireless communications technology that allows device-to-device signaling. For example, Bluetooth Low Energy (BLE) can be used for device-to-device communications including broadcasting and detecting signals for both the sought and the seeker devices. Ultra Wideband (UWB) is another communication technology that may be used for device-to-device signaling during method 500. It is not required that the devices "pair" using the wireless communications technology, though; only that a seeker device can generate signals (e.g., beacon signals) and that the sought device can detect those signals.

When there is only one seeker, the method 500 is implemented by a locating system and starts at 510 with a find-me or locating session being triggered on the sought. Triggering the "find me" session can be done in a number of ways including a button press by the operator, sensing a shake of the sought by the operator, the sought detecting a fall of its operator, a user interacting with the device in a manner differing from pressing a button (such as voice commands, calling a number to request a service at their present location, and so on), and receiving a remote signal over the communications network to which the sought is linked (e.g., a command from a remote user may initiate the session to allow them to locate the sought device).

Once triggered in step 510, the method 500 continues at 520 with the sought device sending out a "find me" message, which includes an approximate location of the sought device. The approximate location may be determined in a variety of ways such as using GPS or other location technology or through some other means of providing the location of the sought device. The method 500 is useful for precisely locating the sought device or at a finer granularity than is possible using satellite GPS or equivalent location technologies. These location technologies tend to have an accuracy in the range of 3 to 10 meters at best but that may be worse than this range when the sought device is indoors or when other obstructions impede the location technology. The method 500 (and other processes described herein) is designed to get a person operating a seeker device within wireless range of the sought device using the approximate location provided by the location technology and then to close the gap down to zero distance (e.g., within 1 meter) or, in other words, to solve the last mile problem.

As part of step 520, the "find me" message is ultimately delivered to one seeker (or more in some cases) who may choose to or be required to join the search for the sought sending the message in 520. The sought device may continue to issue location updates with approximate locations using their location technologies (e.g., repeat all or portions of step 520). This allows the sought device to be found even if it moves from its original location (e.g., moves from a first location to a second location while the seeker is moving into wireless range). In step 530, the sought device starts scanning for seeker devices. Particularly, the sought device is configured to start listening for any seekers that come within wireless range. This may involve, for example, a BLE scan being performed by the sought device. Scanning such as this is typically allowed by smartphone operating systems while an application or app is in the background (i.e., not requiring direct user interaction). On the other hand, smartphone operating systems do not typically allow wireless broadcasting in the background, which is one reason the locating systems and method described herein have reversed the roles of seeker and sought (e.g., requiring the seeker device to transmit beacon signals instead of the sought device).

As shown in FIG. 5, the method 500 continues at 540 with the seeker joining the search for the sought device and starting broadcasting of beacon signals. When a seeker device joins the search in step 540, it will start broadcasting a wireless signal with the seeker identity in the message or signal payload. The operator or user of the seeker device uses the approximate location to get within a wireless range of the sought device, with the understanding that the operator or user and their seeker device may have a starting point that is nearly anywhere and can be a distance well outside the wireless range when they join the search.

In step 550, the sought detects the seeker and responds by sending messages to the seeker. The sought device will be scanning for seeker devices as soon as the seeker session has been triggered. Once the seeker device is within the wireless range of the sought device, the sought device is adapted to detect a seeker's signal in its scan and to determine the relative signal strength indicator (RSSI) of that signal. Using the seeker's identity from the payload of the seeker's beacon signal or broadcast message from step 540, the sought device is adapted to operate to send a message to the seeker device, such as over the network ultimately to the seeker device. This responsive message indicates to the seeker device the detected signal strength as well as the sought device's location updates from its location technologies.

In step 560, the seeker device operates to use the power level setting of its broadcast signal along with the detected signal strength sent from the sought device to compute a distance value from the seeker device to the sought device. The distance value may then be displayed to the user or operator of the seeker device such as in a GUI provided on its display that may take the form of the graphics 600A and 600B shown in FIGS. 6A and 6B, which shows an original display with graphic 600A that is changed to graphic 600B as the seeker device is moved closer to the sought device providing textual and visual feedback of proximity to the user/operator of the seeker device. This updating of the graph is shown as step 570 in method 500, with steps 550-560 being repeated until the sought is found by the seeker.

Figure 7:
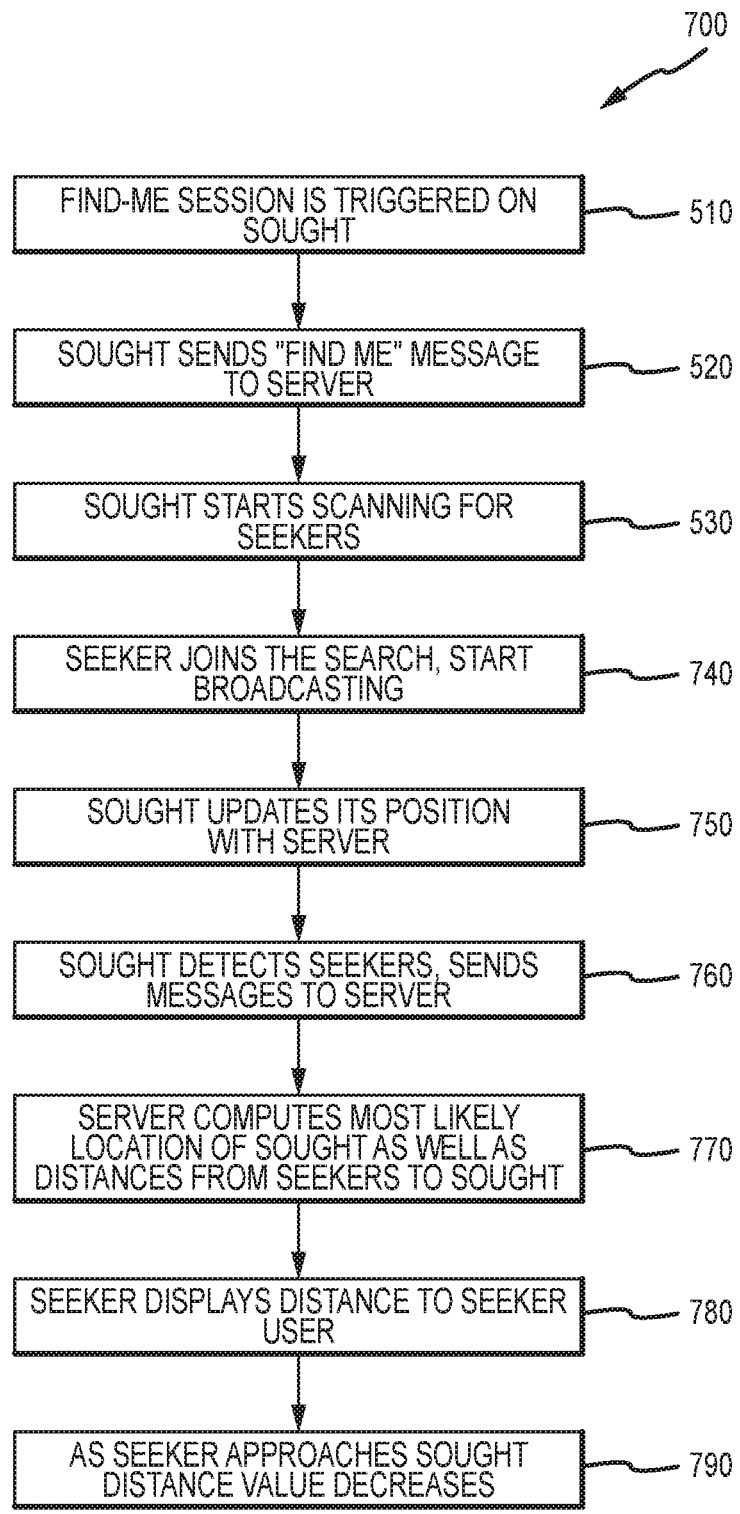
FIG. 7 is a flow diagram similar to that of FIG. 5 showing a locating method in which multiple seeker devices are concurrently searching for a sought device in a locating or response system of the present description.

In some cases, multiple people will each operate a seeker device and cooperatively work toward locating a sought device and an associated operator of the sought device. FIG. 7 is a flow diagram similar to that of FIG. 5 showing a locating method 700 in which multiple seeker devices are concurrently searching for a sought device in a locating or response system of the present description. The method 700 starts similarly to method 500 with the performance of steps 510 to 530 by operation of the sought device as described above for method 500. Step 740 is similar to step 540 in that each seeker who joins the search begins broadcasting signals for receipt by the sought device while step 750 is new in that each seeker device uses its location technologies to determine its approximate position and to report this location information to a server for processing. At step 760, the sought device detects each of the seekers (as discussed with regard to step 550 for a single seeker device) and responds by sending messages to the server that include relative signal strength (or power levels) for each seeker device as well as the location updates from its location technologies.

In step 770, the server uses its software applications or logic to perform calculations using the perceived locations (from the location technologies) of all the seeker devices and of the sought device along with the distance calculations from the seeker devices to the sought device. These calculations produce a position of the sought device, and this position is more accurate than the sought device can produce on its own. The computed location can be made once at least one seeker is already within broadcast signal range of the sought. The initial location of sought is used by the seekers to get close enough for the broadcast signals to be received by the sought. When there are signal strengths detected on sought from seekers, then the computation on the server can be done to provide a more accurate location to the seekers. The seekers can also use the distance calculation to close the last mile. Steps 750-780 will loop as the seekers get closer and closer to sought until the sought is found. This method is employing the same technique as before to indicate to the seeker the distance to the sought, but it also provides a more accurate location of the sought.

Figure 6A:
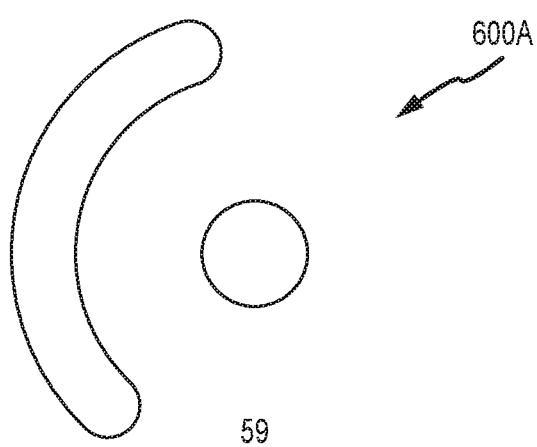
FIGS. 6A and 6B illustrate graphics that may be displayed on a display of a seeker device to provide visual and text-based feedback to an operator of such a device while it is being used to search for a sought device.
Figure 6B:
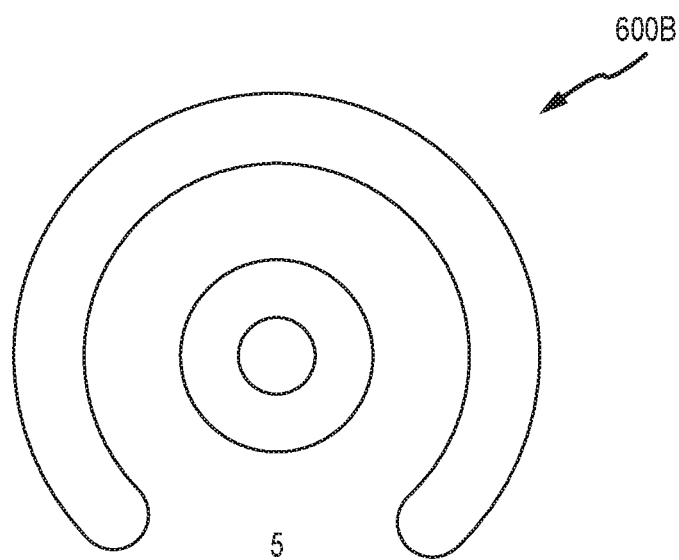

Note, the seeker may have at least two pieces of information in their display: (a) the best-guess location of the sought (usually on a map or floor plan view) and (b) the distance to the sought as indicated in FIGS. 6A and 6B. If the device or system only has the location information from the sought, then that is the location that is displayed on the map to the seeker; however, if a server can compute a more accurate location of the sought, that more accurate location typically would be displayed on the map. A third piece of information that could be displayed is a plot like in FIG. 3. Filters, such as the Kalman filter, may be used to further reduce errors in the calculated position.

Figure 8:
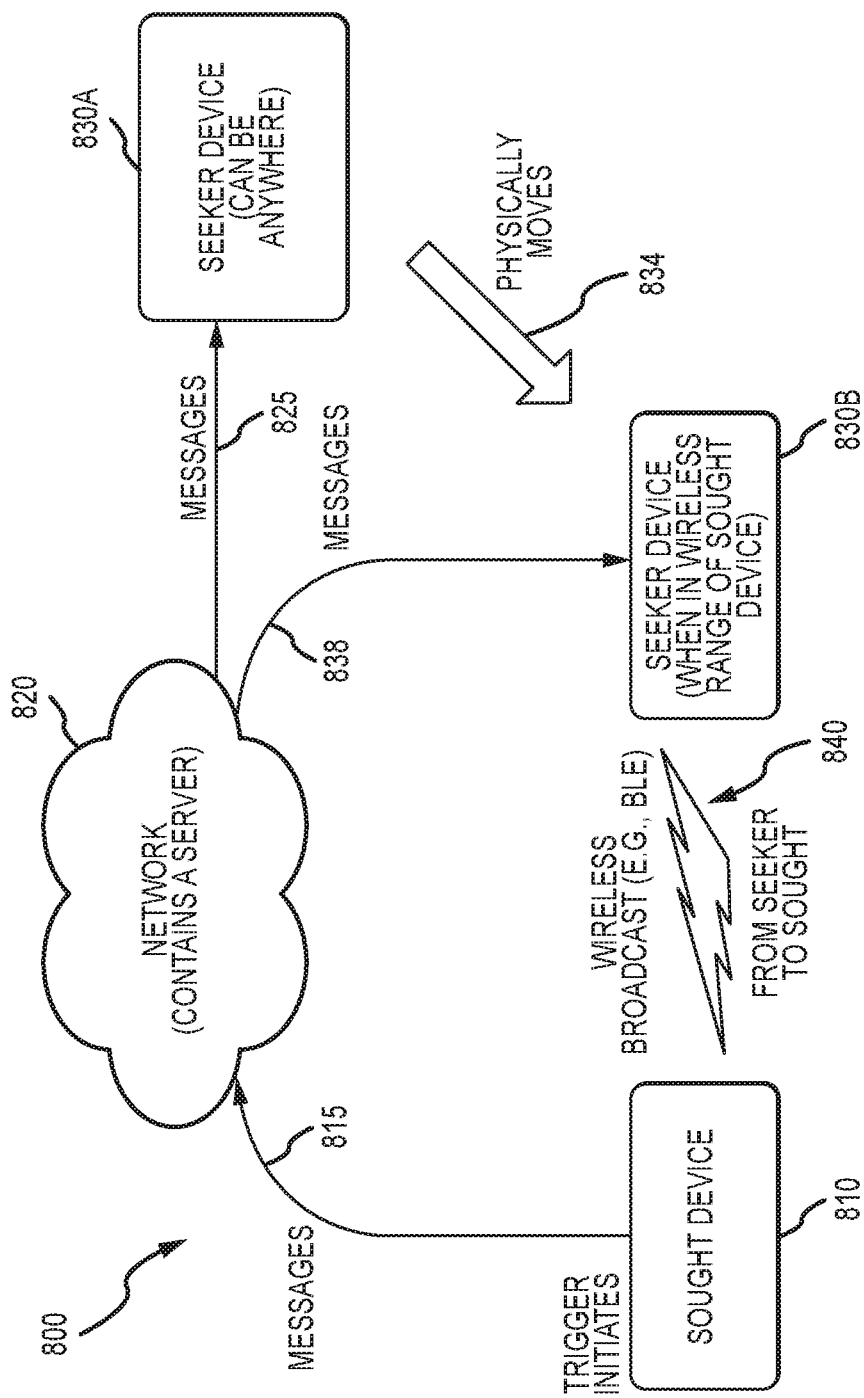
FIG. 8 illustrates a functional block diagram of another embodiment of a response or locating system of the present description such as may be used to implement the methods of FIGS. 5 and 7.

FIG. 8 illustrates a functional block diagram of another embodiment of a response or locating system 800 of the present description such as may be used to implement the methods 500 and 700 of FIGS. 5 and 7. The system 800 includes a sought device (which may be configured as discussed for device 110 of FIG. 1) and a seeker device in two operating states/locations at 830A and 830B (which may be configured as discussed for device 150 of FIG. 1). A communications network 820 is included or used in system 800 to facilitate network-based communications between the sought device 810 and the seeker device 830A, 830B, and the network 820 may include a server (such as seeker service server 140 of system 100 of FIG. 1 or the like).

As shown, the sought device 810 initiates or triggers a response or locating session and transmits messages 815 that include location information produced by its locating technologies. A server in network 820 may, in response, generate messages 825 that are sent to a seeker device 830A that may be located anywhere including outside a wireless range of the sought device 810. The seeker device 830A is moved as shown by arrows 834 by its operator who is joining the search for sought device 810. When in wireless range, the broadcast signals from a seeker device 830B will be received by the sought device 810, and the sought device will send messages 815 to the server on the network 820. The wireless broadcast 840 may be the beacon from device 830B to the sought device 810 that includes an identifier for seeker device 830B in its payload while messages 838 may include location updates from the sought device 810 and signal strength data from the sought device 810 related to the beacon signal 840.

Note, the seeker device 830A will begin transmitting a wireless broadcast signal 840 as soon as it joins the search for the sought device 810 regardless of where it is physically located. Only when the seeker device 830B is within wireless range of the sought device, though, will the sought device 810 detect the signal 840 and that seeker device 830B and respond by sending a message 815 back to the server on network 820 (or to the seeker device 830B as shown with messages 838) so that the distance between the two devices 810 and 830B can be determined and displayed to the operator of the seeker device 830B to assist in locating the sought device 810.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

As will be appreciated, there are numerous use cases for the new locating or response system (and its associate locating methods). The system can be used to allow responders to come to the aid of a person in distress. The distressed person may trigger the "find me" event by pressing a button or by some other discrete method on their smartphone or communication device or on a connected peripheral. In another exemplary use case, the system may be used to allow a responder to come to the aid of a person when the sought device itself senses that person may be in trouble or in need of assistance. For example, sensor readings from sensors on or off the sought device may be used to trigger the "find me" event such as when the sensors or detectors take the form of a fall detector, a smoke detector, or a heartrate detector. The new response system may be used as part of the process of delivering food, beverages, merchandise, or services to a person who has ordered it using a sought device. This person may only want to have the sought device on their person or near to it but not be required to interact with it to facilitate the delivery. In these and other use cases, the sought device can move and still be found since the seekers will receive location updates regarding the sought device as well as the signal strengths related to their wireless signals/messages for calculating distance between the seeker and sought devices.

We claim:

1. A system for locating a sought device, comprising:
   a sought device communicatively linked to a communications network, wherein the sought device uses locating technologies to determine an approximate location of the sought device and wherein the sought device operates to trigger a locating session and to transmit a message over the communications network including the approximate location; and
   a seeker device communicatively linked to the communications network operable to join the locating session and to receive a message over the communications network including the approximate location of the sought device,
   wherein the sought device scans for broadcasts from the seeker device,
   wherein the seeker device broadcasts a wireless message,
   wherein the sought device receives the wireless message from the seeker device, determines a signal strength associated with the wireless message, and transmits the signal strength to the seeker device via the communications network, and
   wherein the seeker device processes the signal strength to determine a direction from a current location of the seeker device to the sought device and to generate an indicator of a location of the sought device relative to a present location of the seeker device, the indicator of the location including an indication of the direction.

2. The system of claim 1, wherein the indicator comprises a distance between the seeker and sought devices.

3. The system of claim 2, wherein the distance is computed based on the signal strength and power level used to broadcast the wireless message.

4. The system of claim 2, further comprising a server connected to the communications network, wherein the seeker device communicates the distance between the seeker and sought devices and a present location of the seeker device determined by its locating technologies and wherein the server receives from two or more other seeker devices distances to the sought device and present locations and, in response, computes a likely location of the sought device and communicates the likely location to each of the seeker devices.

5. The system of claim 2, further comprising a server connected to the communications network, wherein the seeker device sends a current location obtained using its locating technologies and its broadcast power level to the server, wherein the sought device sends the approximate location to the server and the signal strength to the server, wherein the server processes the current location of the seeker device, the broadcast power level, the approximate location of the sought device, and the signal strength to calculate a best location for the sought device, and wherein the server communicates the best location to the seeker device.

6. The system of claim 1, wherein the wireless message includes a payload providing an identifier for the seeker device and wherein the signal strength is communicated via a message over the communications network that includes the signal strength and an update of the approximate location, whereby the sought device may be moving during the locating session.

7. The system of claim 1, wherein the wireless message is broadcast from the seeker device with an operator of the seeker device holding the seeker device and rotating about vertical to two or more angular positions and wherein an indicator of the signal strength is output via operation of the seeker device to the operator for each of the angular positions.

8. The system of claim 1, wherein the wireless message is broadcast from the seeker device using Bluetooth Low Energy (BLE).

9. The system of claim 1, wherein the locating session is triggered by an operator of the sought device interacting with the sought device or by the sought device detecting a triggering event.

10. The system of claim 9, wherein the wherein the sought device performs the scans for broadcasts from the seeker device, the receiving of the wireless message from the seeker device, the determining of the signal strength associated with the wireless message, and the transmitting of the signal strength to the seeker device with no additional actions or interactions with the sought device by the operator.

11. A system for locating a sought device, comprising:
    a sought device configured for network communications and for direct wireless communications, wherein the sought device includes first logic detecting a triggering event and for responding to the triggering event by transmitting a message using the network communications to initiate an operating session of the system to find the sought device and wherein the sought device includes second logic transmitting messages with a present location of the sought device as determined by onboard locating technologies; and
    a seeker device configured for the network communications and for the direct wireless communications,
    wherein the seeker device broadcasts a beacon signal using the direct wireless communications,
    wherein the sought device includes third logic for determining a signal strength of the beacon signal received using the direct wireless communications while in a listening mode and for transmitting a message with the signal strength in an additional message using the network communications,
    wherein the seeker device determines and displays information related to a location of the sought device relative to the seeker device based on the signal strength,
    wherein the information related to a location of the sought device comprises a distance between the sought and seeker devices, and
    wherein the distance is computed by logic on the seeker device based on the signal strength and a power level used by the seeker device to broadcast the beacon signal.

12. The system of claim 11, wherein the beacon signal includes an identifier for the seeker device and wherein the message with the signal strength is communicated to the seeker device using the identifier.

13. The system of claim 11, further comprising a server connected to the communications network, wherein the seeker device communicates the distance between the seeker and sought devices and a present location of the seeker device determined by its locating technologies and wherein the server receives from two or more other seeker devices distances to the sought device and present locations and, in response, computes a likely location of the sought device and communicates the likely location to each of the seeker devices.

14. The system of claim 11, wherein the beacon signal is repeatedly broadcast from the seeker device with an operator of the seeker device holding the seeker device and rotating about vertical to two or more angular positions and wherein an indicator of the signal strength is output via operation of the seeker device to the operator for each of the angular positions.

15. A method of locating a sought device, comprising:
   with a sought device, triggering initiation of a find-me session;
   with the sought device, first determining an approximate location of the sought device;
   with the sought device, transmitting a message with the approximate location and listening for seeker devices within wireless range with a background application and prior to any wireless broadcasting to the seeker devices;
   with one of the seeker devices positioned with a wireless communication range of the sought device, broadcasting a wireless signal;
   with the sought device, receiving the wireless signal and determining a signal strength of the wireless signal; and
   with the one of the seeker devices, second determining data indicative of a present location of the sought device relative to a present location of the one of the seeker devices based on the signal strength.

16. The method of claim 15, further with the one of the seeker devices displaying a graphical indicator for the present location of the sought device on a display of the one of the seeker devices, wherein the indicator provides a distance-based or directional guide for an operator of the one of the seeker devices to the sought device.

17. The method of claim 15, wherein the first determining, transmitting, and receiving steps are performed by the sought device by an application running in background operations of the sought device without input being received from an operator of the sought device.

18. The method of claim 15, further including repeating the first determining, the transmitting, the broadcasting, the receiving, and the second determining until the data indicative of the present location of the sought device indicates the seeker and sought devices are within 1 meter of each other.

* * * * *